Figure 1:
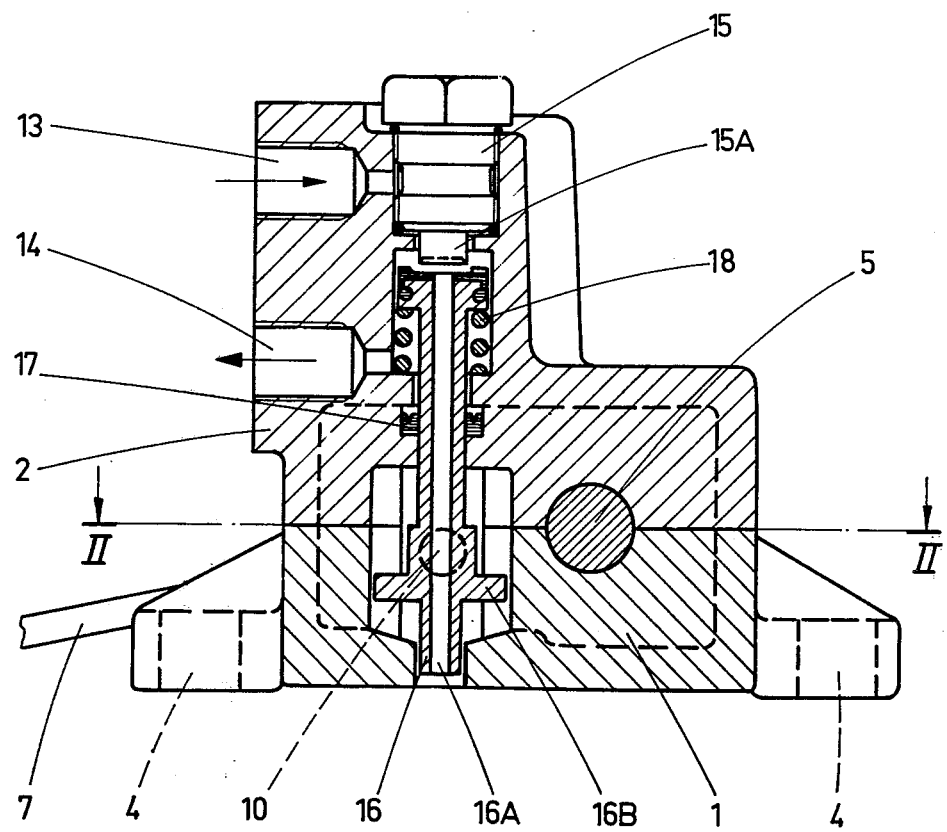

United States Patent [19]
Persson

[11] 4,010,771
[45] Mar. 8, 1977

[54] CHANGE-OVER VALVE, PREFERABLY FOR A RAILWAY VEHICLE

[75] Inventor: Gert Artur Persson, Oxie, Sweden

[73] Assignee: Svenska Aktiebolaget Bromsregulator, Malmo, Sweden

[22] Filed: July 8, 1974

[21] Appl. No.: 486,580

[30] Foreign Application Priority Data

July 11, 1973 Sweden .............................. 7309716

[52] U.S. Cl. .............................. 137/596.1; 188/195; 251/77
[51] Int. Cl.² .............................. B60T 8/18
[58] Field of Search .................. 137/596, 596.1; 188/195; 251/77

[56] References Cited
UNITED STATES PATENTS 3,072,135  1/1963  Moskow .............. 137/505.42 X

FOREIGN PATENTS OR APPLICATIONS 1,240,718  7/1971  United Kingdom .............. 251/48
795,769   5/1958  United Kingdom

*Primary Examiner*—Alan Cohan
*Assistant Examiner*—Gerald A. Michalsky
*Attorney, Agent, or Firm*—Laurence R. Brown

[57] ABSTRACT

A change-over valve controls a source of fluid under pressure to signal at an outlet line one of two different pressures in response to applied forces such as load on a vehicle. The valve has a rotary lever load application arm receiving the applied forces to rotate it against the force of a return spring. In unloaded condition the return spring vents the outlet line to atmospheric pressure. A spring loaded valve controls the fluid pressure path to the outlet line and is operated as the applied load force increases to provide fluid under pressure to the outlet line.

4 Claims, 3 Drawing Figures

CHANGE-OVER VALVE, PREFERABLY FOR A RAILWAY VEHICLE

This invention relates to a change-over valve, preferably for a railway vehicle, comprising a valve device for emitting one of two different pneumatic pressures at a steady pneumatic ingoing pressure and a control device co-acting with the valve device and arranged to be actuated at the springing of the vehicle under increasing load thereon.

At the most common type of such change-over valves, for example known through British Patent No. 977,247, the control device comprises an axially movable control rod, which is arranged axially in series with the valve device. This means that great forces can be transmitted to the valve device from the vehicle underframe via the push rod, which forces can be detrimental for the valve device. Another drawback with the conventional change-over valve is that its design and configuration makes it difficult to mount it protected against external influences of for example dirt, water, ice, and heat. Especially severe conditions for a change-over valve are encountered on ore-wagons, which in winter often are heated by open fire before unloading.

The axial movements of the push rod on conventional change-over valves give rise to severe sealing and wear problems, especially under the conditions mentioned above. It is thus advantageous to replace this axial movement by a rotational movement relative to the change-over valve itself. Such an alteration, which is known per se, makes it also possible to mount the change-over valve more prevented from external influences.

It is of course desirable to maintain the condition with the great forces from the vehicle acting on the control device, as otherwise the control device can freeze on to the change-over valve itself or fail to work properly due to corrosion or minor deformations.

On the other hand it is not desirable to allow the great forces from the vehicle and acting on the control device to reach the valve device in the change-over valve.

The object of the present invention is thus to obviate the mentioned disadvantages, especially to prevent the forces from the vehicle from acting on the valve device, and to accomplish an improved change-over valve of the kind referred to above.

This is according to the invention attained in that a valve operating spring is urging the valve device towards its position for loaded vehicle and that a control device return spring, which is more powerful than the valve operating spring, is urging the control device and the valve device to the position for unloaded vehicle, a lost motion connection being arranged between the valve device and the control device, so that the former is only actuated by the latter at the movement of the latter under the influence of the return spring.

In a practical embodiment the change-over valve comprises an axially movable valve stem urged in a valve opening direction by the valve operation spring and a control pin being part of the control device and urged in a direction substantially opposite to said direction by the return spring. In such a case there is according to the invention a flange on the valve stem against which the control pin is arranged to act under the influence of the return spring.

It is thus apparent that the great forces from the vehicle are not transmitted to the valve device. The invention is not limited to the described embodiment, and many modifications are possible within the scope of the appended claims.

Figure 2:
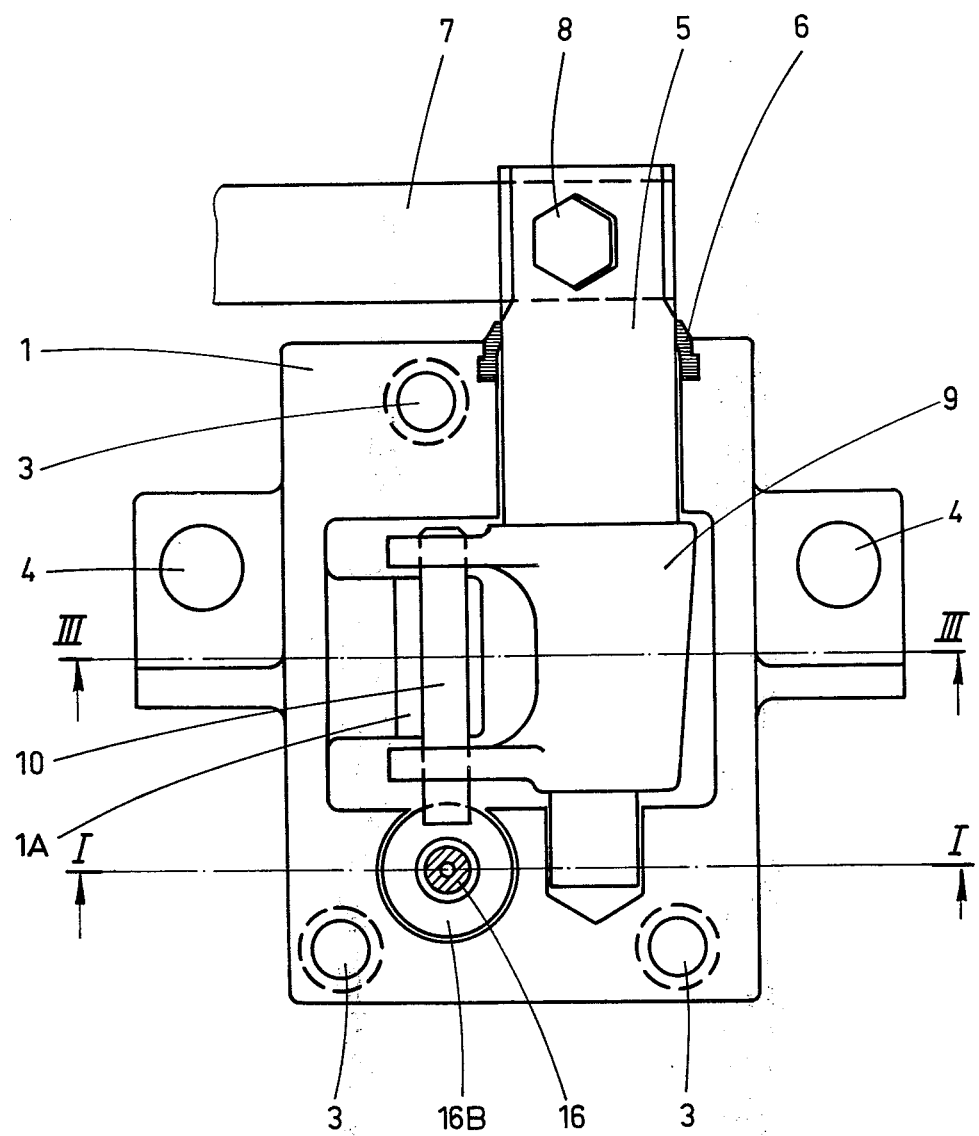
Figure 3:
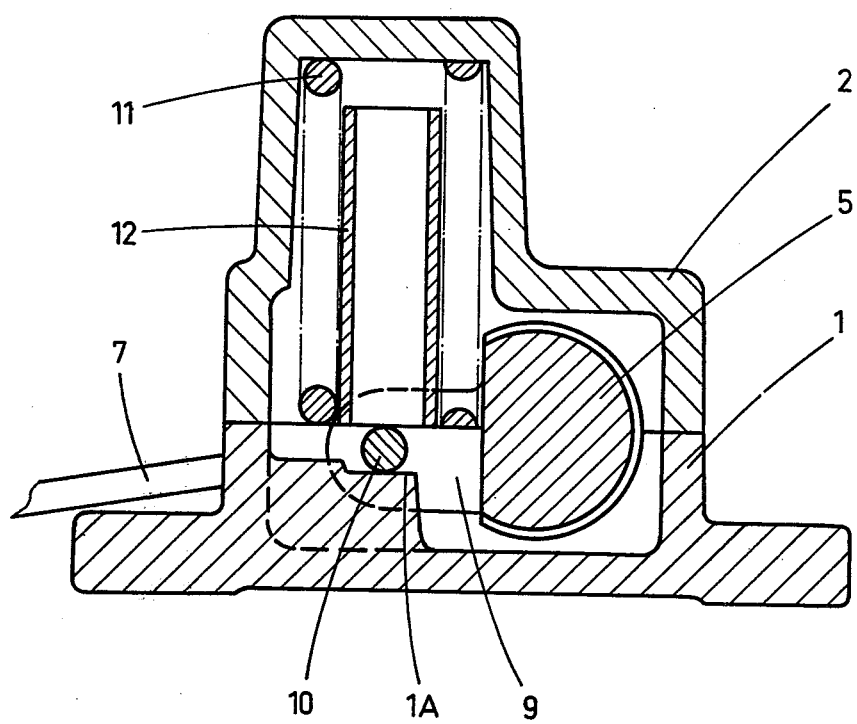

The invention shall be described in further detail below, reference being made to the accompanying drawings, in which FIG. 1 is a cross sectional view of a change-over valve according to the invention substantially along the line 1—1 in FIG. 2, FIG. 2 is a view at the parting line of the valve substantially along the line II—II in FIG. 1, and FIG. 3 is a cross sectional view of the valve substantially along the line III—III in FIG. 2.

A change-over valve housing consists of a lower part 1 and an upper part 2, connected by bolts (not shown) in holes 3 in the two parts. The lower part 1 is provided with attachment holes 4 for the mounting of the valve to a suitable part of a vehicle underframe.

A control shaft 5 is rotatably journalled in the valve housing, and a control shaft sealing 6 is mounted at the shaft exit from the housing. At the end of the control shaft 5 extending outside the housing 1,2 there is mounted a control arm 7 by means of a slit in the shaft end and a bolt 8.

This control arm 7, of which only a part is shown in the drawings and which is made of spring steel, is intended to be actuated by another vehicle underframe part than that on which the valve itself is mounted. These two underframe parts will move in relation to each other at the springing of the vehicle, i.e. at load changes thereon, and the arrangement is such that the control shaft 5 will be turned clockwise in FIGS. 1 and 3 when the vehicle load increases.

A control yoke 9 integral with the control shaft 5 has a fixed control pin 10 for co-operation with a valve device to be described below.

As shown in FIG. 3 a helical compression spring 11 is arranged between the control pin 10 and the upper housing part 2. This spring 11 urges the control pin 10 against an abutment 1A in the lower housing part and can be called a return spring as it tends to turn the control shaft 5 anti-clockwise, i.e. in the direction for decreasing vehicle load. Inside the spring 11 is a spring support 12, which by its length will limit the possible movement for the control pin 10 and thus the spring compression.

In the upper housing part 2 there are an inlet 13 to be connected to a supply for compressed air and an outlet 14 to be connected to a pressure-responsive device (not shown), preferably a load brake device.

A valve insert 15 is screwed into the upper housing part 2 at the inlet 13. This valve insert is such that no air can pass it in its shown rest position, when an internal spring will keep it shut, whereas air from the inlet 13 will pass it, if its movable projection 15A is lifted by a valve stem 16.

This valve stem 16 is axially movable in a bore in the housing 1,2 provided with a sealing 17. The valve stem 16 has a venting passage 16A venting the space above the sealing 17 and thus the outlet 14 to the atmosphere in the shown position of the valve stem 16. The valve stem 16 is provided with a flange 16B against which the control pin 10 will press under influence of the return spring 11 at decreasing vehicle load. A valve operation spring 18 urges the valve stem 16 upwards by being arranged as shown in FIG. 1.

The valve insert 15 and the valve stem 16 with the valve operation spring 18 can together be called a valve device.

The described change-over valve will function as follows:

If the vehicle on which the valve is mounted is empty the return spring 11 will hold the control pin 10 and thus the valve device 15-18 in the shown position (with the valve operation spring 18 somewhat compressed), so that the outlet 14 is vented to the atmosphere and the inlet 13 is shut off. Atmospheric pressure will thus prevail in the outlet 14.

If on the other hand the vehicle load increases above a certain value the control pin 10 will be moved upwards under the influence of a great force from the vehicle via the control arm 7. This control pin movement upwards means that the valve stem 16 is free to move upwards under the influence of the valve operation spring 18. The valve stem passage 16A will be closed by the valve insert projection 15A, which will be pressed upwards opening the passage from the inlet 13 to the outlet 14.

It appears that the forces acting on the control arm 7 at increasing vehicle load will not be transmitted to the valve device 15-18, which will be operated in its valve opening direction by the valve operation spring 18 and in its valve closing direction by the return spring 11. It also appears that the valve control movement is a small rotational movement, which gives less wearing and sealing problems than an axial movement of a control member.

Modifications are of course possible within the scope of the appended claims.

I claim:

1. A change-over valve operating mechanism operable by an applied force such as the weight of a vehicle, comprising in combination, means providing a flow path from an input fluid flow coupling to an output fluid flow coupling, a fluid control valve connected in said path for permitting flow of fluid under pressure through said path in one position and preventing flow of fluid to said output coupling in a further position, said valve having a member movable to two different positions respectively, and a control device operating said fluid control valve member in either of said positions comprising, a rotary mechanism rotatable in response to said applied force for moving said valve to said two positions as a function of said applied force, a return spring urging said mechanism in a position placing the valve member in a first of said two positions, structure coupling said rotary mechanism to said spring so that in response to an applied force of pre-determined magnitude the mechanism overcomes the spring and permits the valve member to move into the second of said two positions, wherein the structure limits the applied pressure on the valve to the force of said spring and having said fluid control valve spring biased by a spring less powerful than said return spring, whereby said less powerful spring urges said fluid control valve into said position permitting flow of fluid through said path when said rotary mechanism overcomes the return spring.

2. A valve mechanism as defined in claim 1 including a lost motion mechanism comprising disconnect means between said fluid control valve and said control device permitting further movement of said control device after said valve is closed to prevent flow of fluid.

3. A valve mechanism as defined in claim 2 having a movable valve stem arranged in said fluid control valve to vent said flow path to the atmosphere in that condition where fluid is not flowing through said path.

4. A valve mechanism as defined in claim 3 wherein the valve stem has a flange engaging said rotary mechanism so that said return spring holds said stem in a position venting said flow path.

* * * * *